United States Patent
Wicks

(10) Patent No.: US 10,202,888 B2
(45) Date of Patent: Feb. 12, 2019

(54) ENGINE AIR PATH COOLING SYSTEM

(71) Applicant: Ford Global Technologies, LLC, Dearborn, MI (US)

(72) Inventor: Christopher Donald Wicks, Allen Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 245 days.

(21) Appl. No.: 14/962,989

(22) Filed: Dec. 8, 2015

(65) Prior Publication Data

US 2017/0159547 A1 Jun. 8, 2017

(51) Int. Cl.
| | |
|---|---|
| *F01P 9/06* | (2006.01) |
| *B60H 1/00* | (2006.01) |
| *F01P 7/00* | (2006.01) |
| *F02B 75/18* | (2006.01) |
| *F02D 41/26* | (2006.01) |
| *F02F 1/02* | (2006.01) |
| *F02F 1/26* | (2006.01) |
| *F02M 35/10* | (2006.01) |
| *F02M 35/104* | (2006.01) |
| *F02D 41/00* | (2006.01) |
| *B60K 11/02* | (2006.01) |
| *B60H 1/14* | (2006.01) |
| *F01P 3/02* | (2006.01) |

(52) U.S. Cl.
CPC ............ *F01P 9/06* (2013.01); *B60H 1/00271* (2013.01); *B60H 1/14* (2013.01); *B60K 11/02* (2013.01); *F01P 3/02* (2013.01); *F01P 7/00* (2013.01); *F02B 75/18* (2013.01); *F02D 41/0002* (2013.01); *F02D 41/26* (2013.01); *F02F 1/02* (2013.01); *F02F 1/26* (2013.01); *F02M 35/104* (2013.01); *F02M 35/10268* (2013.01); *B60H 2001/00307* (2013.01); *F01P 2003/024* (2013.01); *F02D 2200/0414* (2013.01); *Y02T 10/42* (2013.01)

(58) Field of Classification Search
CPC ........ F01P 9/06; F01P 7/00; F02M 35/10268; F02M 35/104; F02B 75/18; F02F 1/26; F02F 1/02; F02D 41/26; B60H 1/00271; B60H 2001/00307

See application file for complete search history.

(56) References Cited

U.S. PATENT DOCUMENTS

| | | | |
|---|---|---|---|
| 5,871,001 A | 2/1999 | Pelkey | |
| 5,884,588 A * | 3/1999 | Ap | F01P 11/20 123/41.14 |
| 6,647,934 B2 | 11/2003 | Marsh et al. | |
| 7,658,183 B1 | 2/2010 | Johnson | |
| 2014/0360445 A1* | 12/2014 | Reynolds | F01P 3/00 123/41.44 |

(Continued)

*Primary Examiner* — Sizo Vilakazi
(74) *Attorney, Agent, or Firm* — Julia Voutyras; McCoy Russell LLP

(57) ABSTRACT

Methods and systems are provided for selectively re-cooling intake air downstream of a charge air cooler. In one example, a system may include a cylinder head defining a plurality of cylinders, the cylinder head including a plurality of inlet ports each fluidically coupled to a respective cylinder, a refrigerant supply, and a refrigerant passage surrounding each inlet port and fluidically coupled to the refrigerant supply, the refrigerant passage shaped to correspond to an outer profile of each inlet port.

10 Claims, 13 Drawing Sheets

(56) References Cited

U.S. PATENT DOCUMENTS

| | | | |
|---|---|---|---|
| 2015/0047603 A1* | 2/2015 | Surnilla | F02D 41/0007 123/350 |
| 2015/0219040 A1* | 8/2015 | Kasic | B23P 11/025 123/193.5 |
| 2016/0177881 A1* | 6/2016 | Wicks | F02M 35/10268 123/568.12 |
| 2017/0009642 A1* | 1/2017 | Kurtz | F02B 29/0493 |

* cited by examiner

ENGINE AIR PATH COOLING SYSTEM

FIELD

The present description relates generally to methods and systems for cooling inlet air entering an engine cylinder.

BACKGROUND/SUMMARY

Turbocharged and supercharged engines may be configured to compress ambient air entering the engine in order to increase power. Because compression of the air may cause an increase in air temperature, a charge air cooler may be utilized upstream of the engine air inlet to cool the heated air before it enters the engine, thereby increasing air density and improving combustion of fuel by an engine cylinder, resulting in more power and improved fuel economy. However, the cooled air exiting a charge air cooler upstream of an engine may be re-heated by the engine, particularly during high engine load and/or high engine temperature conditions, thus negating many of the benefits of the charge air cooler.

Other attempts to address cooling intake air include a cooling duct surrounding an air intake line. One example approach is shown by Johnson in U.S. Pat. No. 7,658,183. Therein, latent heat from the intake air is removed via a chilled intake air assembly duct located upstream of the engine.

However, the inventors herein have recognized potential issues with such systems. As one example, by placing the chilled intake air assembly duct relatively far from the engine, the intake air may still be re-heated prior to entry in the cylinders.

In one example, the issues described above may be addressed by a system comprising a cylinder head defining a plurality of cylinders, the cylinder head including a plurality of inlet ports each fluidically coupled to a respective cylinder, a refrigerant supply, and a refrigerant passage surrounding each inlet port and fluidically coupled to the refrigerant supply, the refrigerant passage shaped to correspond to an outer profile of each inlet port. In this way, intake air may be re-cooled at the inlet ports prior to entering the cylinders for combustion, thus increasing available engine power and reducing emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
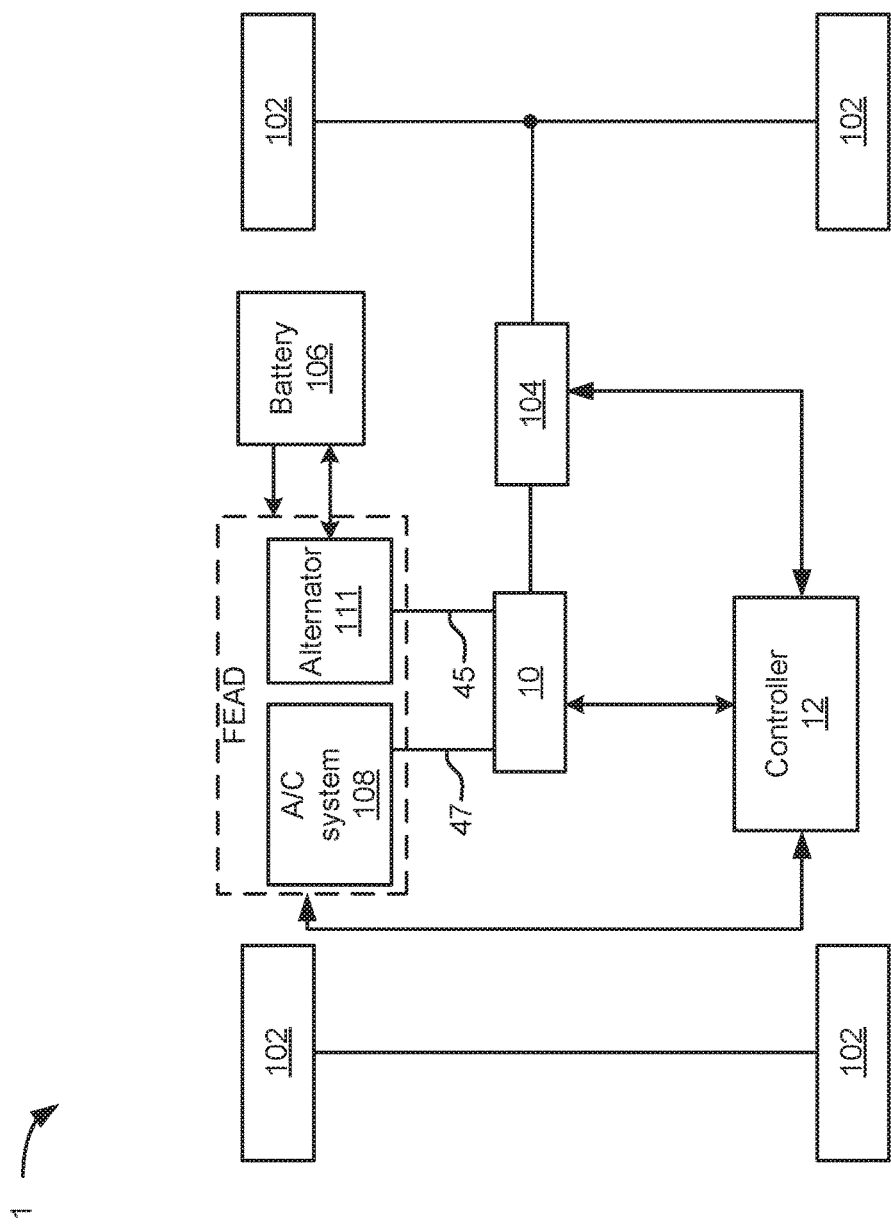
FIG. 1 shows an example vehicle having an engine.
Figure 2:
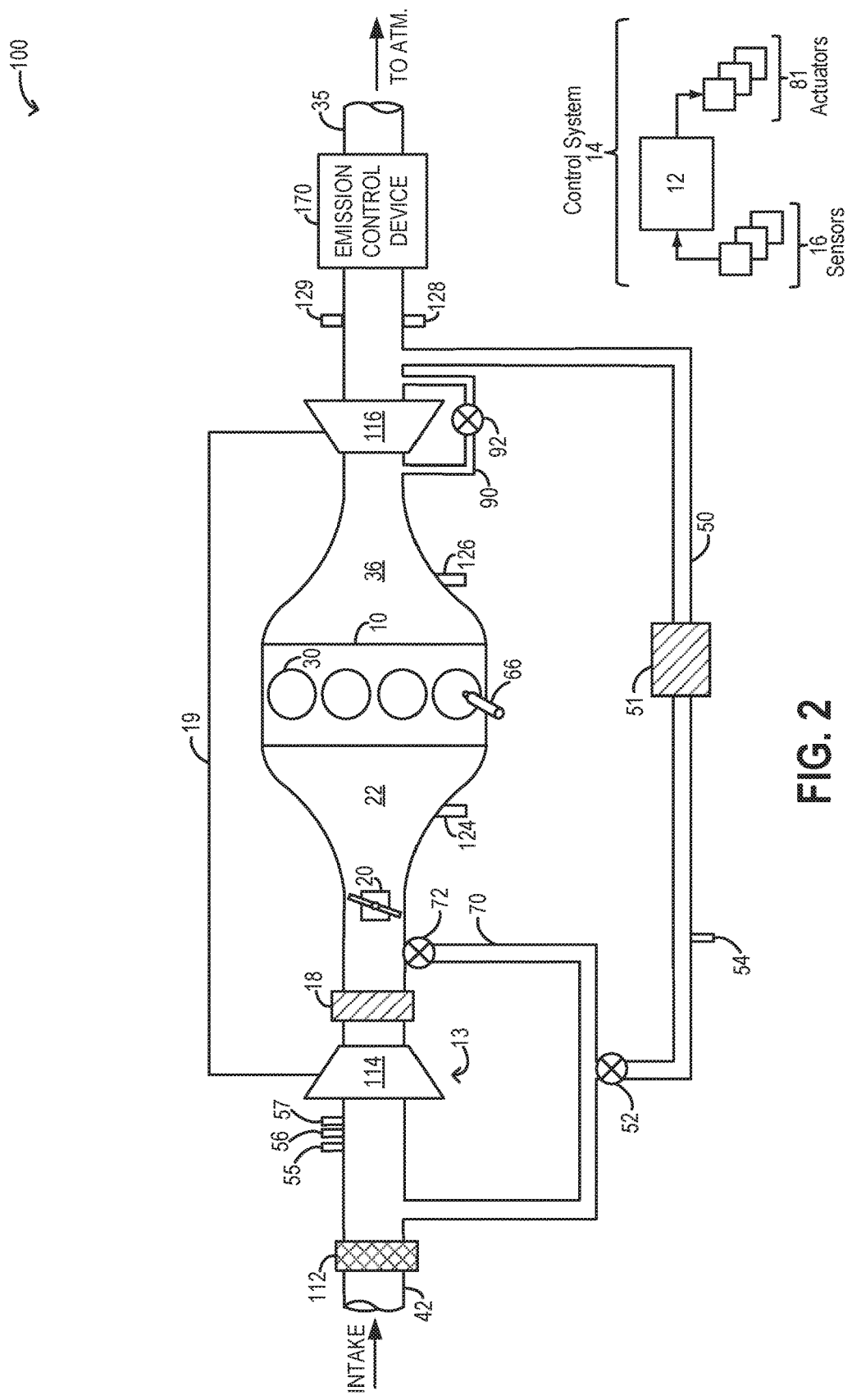
FIG. 2 shows an example engine system including the engine of FIG. 1.

The following description relates to systems and methods for re-cooling intake air downstream of a charge air cooler. Charge air coolers may cool compressed intake air downstream of a compressor, thus increasing engine power and reducing emissions. However, the degree to which the intake air may be cooled via the charge air cooler is typically limited, as charge air coolers tend to be cooled via ambient air or via engine coolant, neither of which may be substantially cooler than the compressed intake air, particularly during high ambient temperature or high load conditions. Further, the intake air may be re-heated by heat rejection from the engine prior to entering the engine. Thus, to re-cool the intake air, refrigerant passages may be present around the inlet ports of the cylinder head and/or around the intake runners of the intake manifold. The passages may be supplied with refrigerant, thus allowing for a high degree of cooling. FIG. 1 is a vehicle including an engine and a refrigerant supply, herein an air conditioning system. FIG. 2 is an engine system including the engine of FIG. 1 and that may be installed in the vehicle of FIG. 1. FIGS. 3-12 illustrate various examples of refrigerant cooling systems that may be used to re-cool the intake air immediately upstream of the cylinders. FIG. 13 illustrates a method that may be executed by the controller of FIGS. 1 and 2 in order to re-cool the intake air.

FIGS. 1-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. FIGS. 3-12 are drawn to scale, although other relative dimensions may be used.

Referring now to FIG. 1, vehicle 1 includes wheels 102. Torque is supplied to wheels 102 via engine 10 and transmission 104. In some examples, an electric motor or hydraulic motor may also provide torque to wheels 102. A Front end accessory drive (FEAD) includes alternator 111 and air conditioning (A/C) system 108. Alternator 111 and A/C system 108 may each be mechanically coupled to engine 10 via shaft or pulley 45, 47, or may be mechanically coupled to engine 10 via a common shaft or pulley. Additionally, alternator 111 may provide and/or receive electricity to battery 106. The AC system may be engaged or operated in response to an operator request for vehicle cabin cooling, dehumidification of cabin air, and/or for defrosting. Additional details regarding the AC system will be provided below with respect to FIG. 3. Battery 106 and alternator 111 may provide electrical power to various engine accessory components not shown in FIG. 1. Controller 12 includes instructions for controlling and receiving inputs from alternator 111, A/C system 108, engine 10, and transmission 104.

FIG. 2 schematically shows aspects of an example engine system 100 including engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 100, however, the compressor is a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 2, compressor 114 is coupled, through charge-air cooler (CAC) 18 (herein also referred to as an intercooler) to throttle valve 20. Throttle valve 20 is coupled to engine intake manifold 22. From the compressor, the compressed air charge flows through the charge-air cooler 18 and the throttle valve to the intake manifold. The charge-air cooler may be an air-to-liquid heat exchanger, or may be an air-to-air heat exchanger, for example. Because flow through the compressor can heat the compressed air, a downstream CAC 18 is provided so that boosted intake air charge can be cooled prior to delivery to the engine intake.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of air charge entering the compressor. Still other sensors may include, for example, an exhaust gas sensor for detecting exhaust oxygen concentration, NOx sensors, etc. In other examples, one or more of the compressor inlet conditions (such as humidity, temperature, pressure, etc.) may be inferred based on engine operating conditions. In addition, when EGR is enabled, the sensors may estimate a temperature, pressure, humidity, and air-fuel ratio of the air charge mixture including fresh air, recirculated compressed air, and exhaust residuals received at the compressor inlet.

During selected conditions, such as during a tip-out, when going from engine operation with boost to engine operation without boost, compressor surge can occur. This is due to an increased pressure differential being generated across the compressor when the throttle closes at the tip-out. The increased pressure differential reduces forward flow through the compressor, causing surge and degraded turbocharger performance. In addition, surge can lead to NVH issues such as undesirable noise from the engine intake system. To relieve boost pressure and reduce compressor surge, at least a portion of the air charge compressed by compressor 114 may be recirculated to the compressor inlet. This allows excess boost pressure to be substantially immediately relieved. The compressor recirculation system may include a compressor recirculation passage 70 for recirculating cooled compressed air from the compressor outlet, downstream of charge-air cooler 18 to the compressor inlet. In some embodiments, an additional compressor recirculation passage (not shown) may be provided for recirculating un-cooled (or warm) compressed air from the compressor outlet, upstream of charge-air cooler 18 to the compressor inlet.

A compressor recirculation valve (CRV) 72 may be coupled to compressor recirculation passage 70 (also referred to as compressor bypass) to control an amount of cooled compressor flow recirculated to the compressor inlet.

In the depicted example, CRV 72 may be configured as a continuously variable valve wherein a position of the valve is continuously variable from a fully closed position to a fully open position and any position there-between. CRV 72 may be positioned in passage 70, downstream of CAC 18 and upstream of an inlet of compressor 114. A position of CRV 72 may be adjusted during boosted engine operation to improve peak performance and provide a margin to surge. In one example, the CRV may be maintained closed during boosted engine operation to improve boost response and peak performance. In another example, the CRV may be maintained partially open during boosted engine operation so as to provide some surge margin, in particular, an improved margin to soft surge. In either case, in response to an indication of surge (e.g., hard surge), the opening of the valve may be increased. A degree of opening of the CRV may be based on the indication of surge (e.g., the compressor ratio, the compressor flow rate, a pressure differential across the compressor, etc.). As one example, an opening of the CRV may be increased (e.g., the valve may be shifted from the fully-closed position or partially-open position to a fully-open position) in response to an indication of surge.

Surge may also be relieved by reducing exhaust pressure at turbine 116. For example, a wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge. However, due to the boost dynamics of the wastegate, the effects of compressor recirculation valve adjustments on reducing surge may be faster than the effects of the wastegate adjustments.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 2, exhaust from the one or more exhaust manifold sections is directed to turbine 116 to drive the turbine. When reduced turbine torque is desired, some exhaust may be directed instead through wastegate passage 90, by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NOx from the exhaust flow when the exhaust flow is lean, and to reduce the trapped NOx when the exhaust flow is rich. In other examples, an exhaust after-treatment catalyst may be configured to disproportionate NOx or to selectively reduce NOx with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control device 170 may be released into the atmosphere via exhaust conduit 35. Depending on operating conditions, however, a portion of the exhaust residuals may be diverted instead to EGR passage 50, through EGR cooler 51 and EGR valve 52, to the inlet of compressor 114. As such, EGR passage 50 couples the engine exhaust manifold, downstream of the turbine 116, with the engine intake manifold, upstream of compressor 114. In the depicted example, EGR passage 50 is shown merging with compressor recirculation passage 70 upstream of the compressor inlet. It will be appreciated that in alternate examples, the passages may not merge and the EGR passage may be coupled to the compressor inlet independent of the compressor recirculation passage.

EGR valve 52 may be opened to admit a controlled amount of cooled exhaust gas to the compressor inlet for desirable combustion and emissions-control performance. In this way, engine system 100 is adapted to provide external, low-pressure (LP) EGR by tapping exhaust gas from downstream of turbine 116. EGR valve 52 may also be configured as a continuously variable valve. In an alternate example, however, EGR valve 52 may be configured as an on/off valve. The rotation of the compressor, in addition to the relatively long LP-EGR flow path in engine system 10, provides excellent homogenization of the exhaust gas into the intake air charge. Further, the disposition of EGR take-off and mixing points provides very effective cooling of the exhaust gas for increased available EGR mass and improved performance. In further embodiments, the engine system may further include a high pressure EGR flow path wherein exhaust gas is drawn from upstream of turbine 116 and recirculated to the engine intake manifold, downstream of compressor 114.

EGR cooler 51 may be coupled to EGR passage 50 for cooling EGR delivered to the compressor. In addition, one or more sensors may be coupled to EGR passage 50 for providing details regarding the composition and condition of the EGR. For example, a temperature sensor may be provided for determining a temperature of the EGR, a pressure sensor may be provided for determining a temperature of the EGR, a humidity sensor may be provided for determining a humidity or water content of the EGR, and an air-fuel ratio sensor 54 may be provided for estimating an air-fuel ratio of the EGR. Alternatively, EGR conditions may be inferred by the one or more temperature, pressure, humidity and air-fuel ratio sensors 55-57 coupled to the compressor inlet. An opening of the EGR valve may be adjusted based on the engine operating conditions and the EGR conditions to provide a desired amount of engine dilution.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and EGR sensor 54. Other sensors such as additional pressure, temperature, air/fuel ratio, and composition sensors may be coupled to various locations in engine system 100. The actuators 81 may include, for example, throttle 20, EGR valve 52, compressor recirculation valve 72, wastegate 92, and fuel injector 66. The control system 14 may include controller 12. The controller may receive input data from the various sensors, process the input data, and trigger various actuators in response to the processed input data based on instruction or code programmed therein corresponding to one or more routines. An example control routine is described herein with regard to FIG. 2.

The controller 12 receives signals from the various sensors of FIG. 2 and employs the various actuators of FIG. 2 to adjust engine operation based on the received signals and instructions stored on a memory of the controller. For example, adjusting airflow through the charge air cooler 18 may include adjusting an actuator of throttle 20 to adjust airflow.

As described above, the charge air cooler (CAC) 18 may cool hot compressed air before being admitted to the engine. Hot charge air from the compressor 114 enters the inlet of the CAC 18, cools as it travels through the CAC 18, and then exits to pass though the throttle 20 and into the engine intake manifold 22. Ambient air flow from outside the vehicle may enter engine 10 through a vehicle front end and pass across the CAC 18, to aid in cooling the charge air. Condensate may form and accumulate in the CAC 18 when the ambient air temperature decreases, or during humid or rainy weather conditions, where the charge air is cooled below the water dew point. When the charge air includes recirculated exhaust gasses (from the exhaust gas recirculation system shown in FIG. 2, for example), the condensate can become acidic and corrode the CAC housing. The corrosion can lead to leaks between the air charge, the atmosphere, and possibly the coolant in the case of water-to-air coolers. To reduce the accumulation of condensate and risk of corrosion, condensate may be collected at the bottom of the CAC 18, and then be purged into the engine during selected engine operating conditions, such as during acceleration events. In other examples, the condensate may additionally or alternatively be purged into the exhaust system upstream or downstream of the catalyst. However, if the condensate is introduced at once into the engine inlet air path during an acceleration event, there may be an increase in the chance of engine misfire or combustion instability (in the form of late/slow burns) due to the ingestion of water. Thus, as elaborated herein with reference to FIG. 9, condensate may be purged from the CAC 18 or intake manifold 22 to the engine under controlled conditions. This controlled purging may help to reduce the likelihood of engine misfire events.

Further, while the CAC 18 may adequately cool the intake air under most operating conditions, during high ambient temperature conditions and/or during high engine load conditions, heat rejection from the engine and/or other components may result in the intake air reheating prior to admission to the cylinders. Thus, at least during some conditions the benefits of cooled intake air (increased power and/or reduced emissions) may be lost. According to embodiments disclosed herein, the intake air may be re-cooled downstream of the CAC 18 via one or more refrigerant passages cast around the cylinder inlet ports and/or intake manifold runners. The refrigerant may be sourced from the AC system or from an on-board vessel, and as such may be maintained separately from the engine coolant system. In doing so, the intake air may be cooled to a temperature lower than that possible when cooling with engine coolant or ambient air, for example. Additional details regarding the refrigerant passages and refrigerant source will be provided below with respect to FIGS. 3-8. Additionally, similar to the CAC 18 explained above, re-cooling of the intake air at the intake manifold/inlet ports may cause additional condensation to accumulate in the intake manifold, for example. Thus, various actions may be taken in response to an indication that condensate is accumulating in the intake manifold, as will be explained below with respect to FIG. 9.

Figure 3:
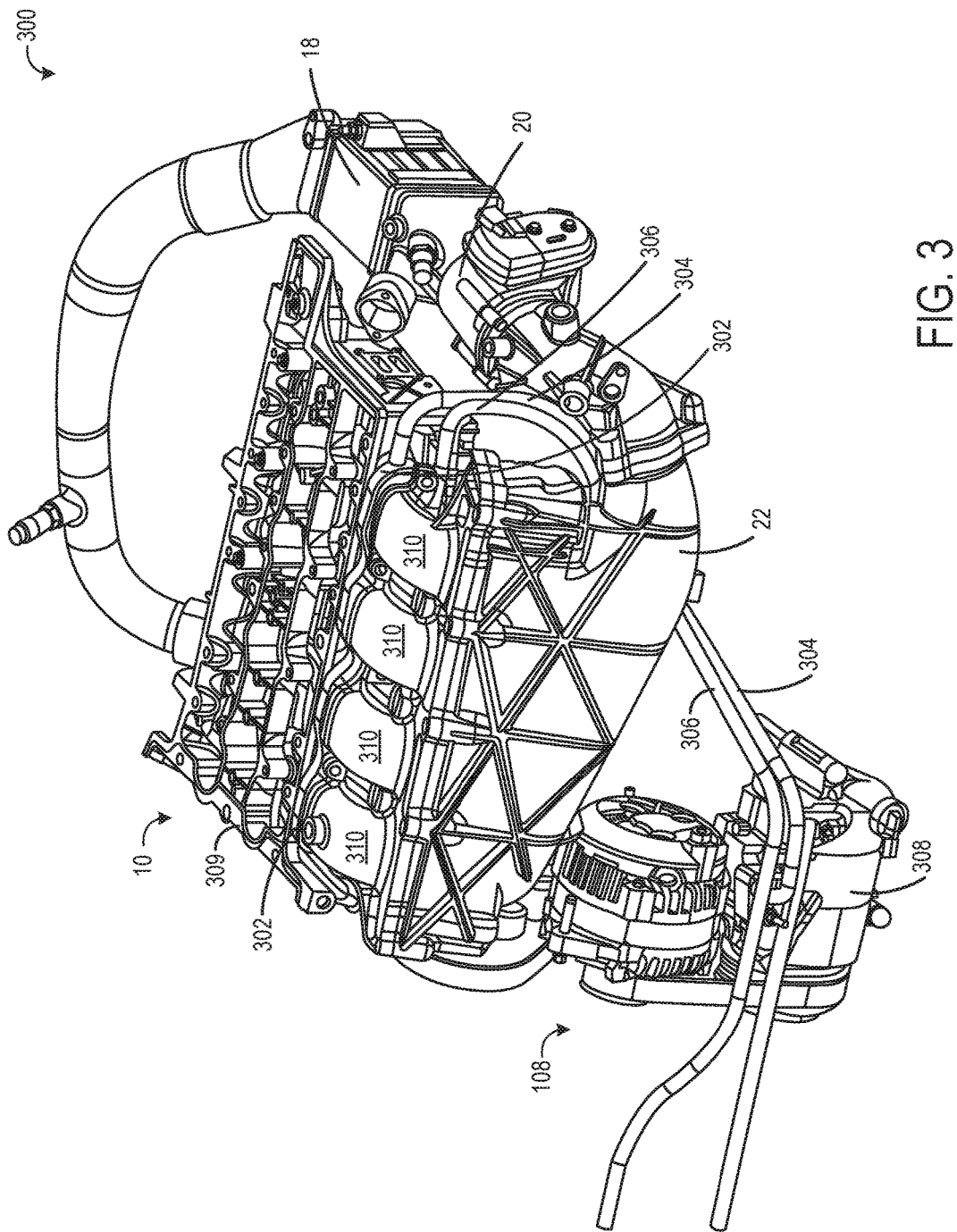
FIGS. 3-5 show a first embodiment of a refrigerant cooling system for cooling intake air prior to entering the engine of FIGS. 1-2.
Figure 4:
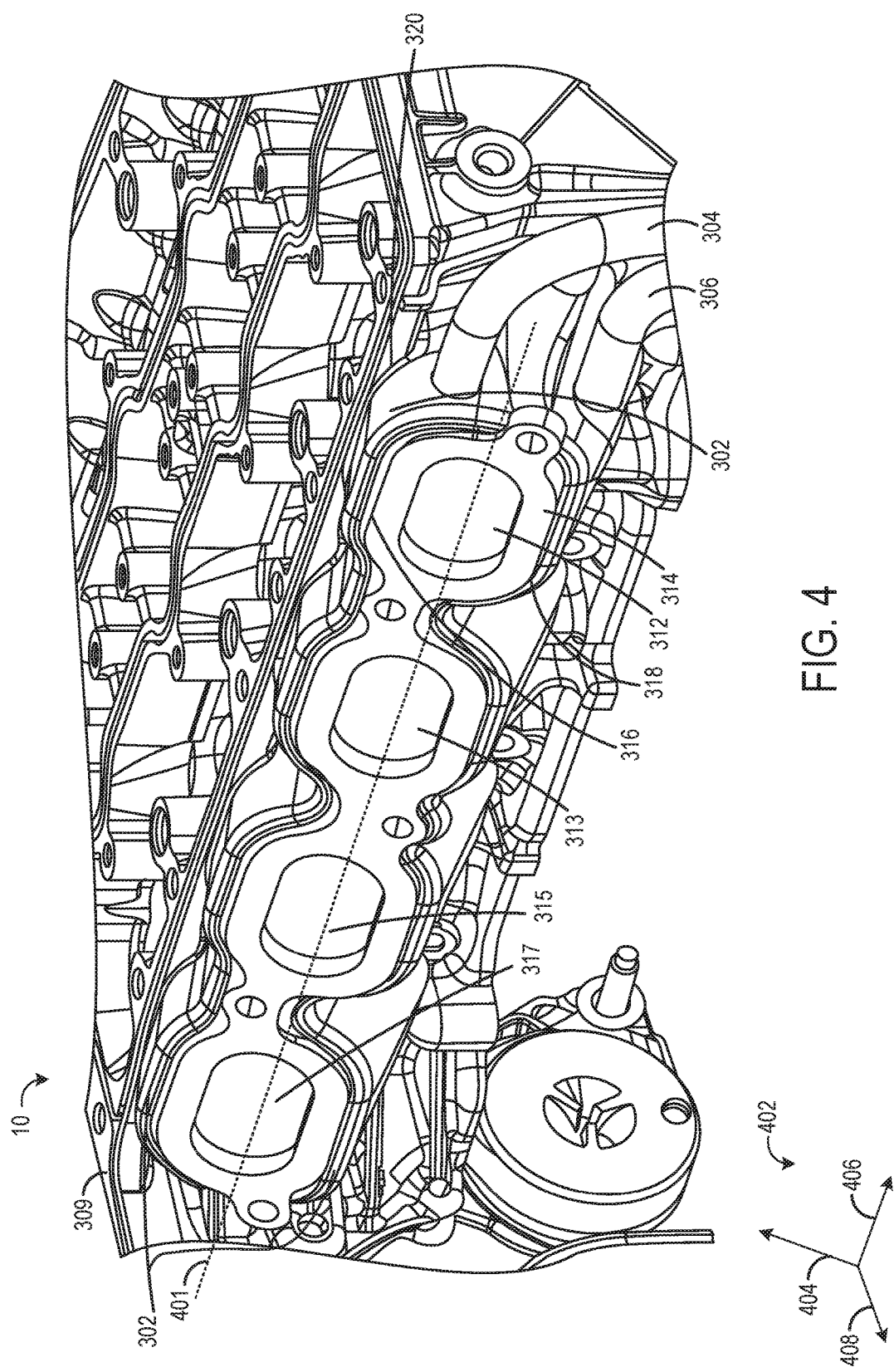
Figure 5:
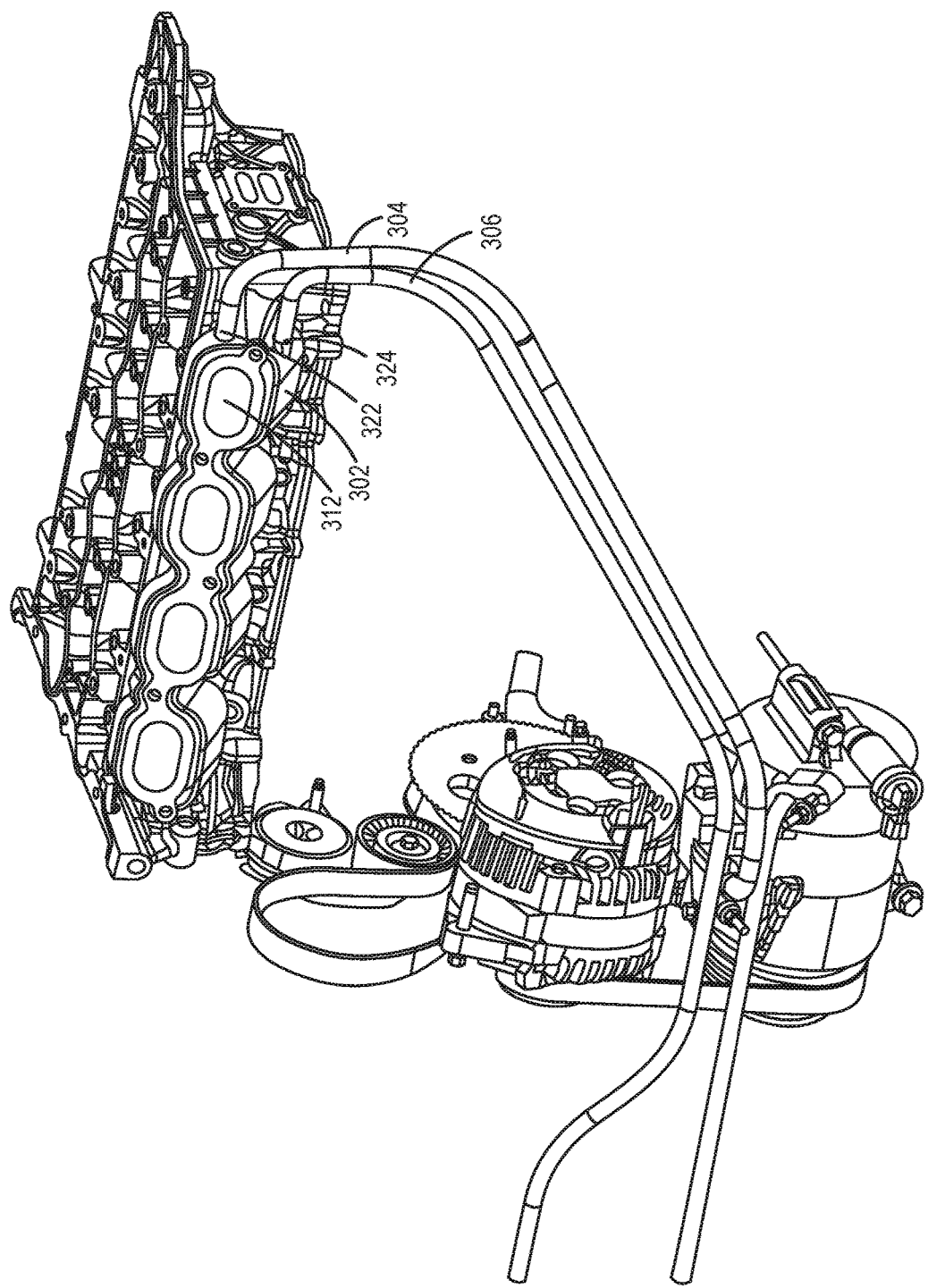

Turning now to FIGS. 3-5, a refrigerant cooling system 300 configured to cool components of engine system 100 is illustrated. Refrigerant cooling system 300 may act to cool intake air entering an engine, such as engine 10 of FIGS. 1 and 2. Accordingly, components illustrated in FIGS. 1 and 2 are given like numbers in FIGS. 3-5 and detailed description thereof will be omitted. FIG. 3 shows a side perspective view of the refrigerant cooling system 300, while FIG. 5 shows the same view, with the intake manifold removed for clarity. FIG. 4 shows a zoomed-in view of the inlet ports and refrigerant passage of FIG. 5.

Refrigerant cooling system 300 includes a refrigerant passage 302 coupled around a plurality of inlet ports (illustrated in FIGS. 4 and 5) of cylinder head 309. Refrigerant passage 302 receives refrigerant from a refrigerant supply line 304 and returns refrigerant to a refrigerant return line 306. Refrigerant supply line 304 is coupled to a compressor 308 of AC system 108. Refrigerant return line 306 is coupled to a condenser of AC system 108 (not shown). While not all shown in FIGS. 3-5, it is to be understood that AC system 108 includes additional various components, including but not limited to an evaporator, fan, climate controller, temperature sensor, etc. In one example, refrigerant is supplied to the evaporator via an evaporator valve after being pumped into the condenser. Compressor 308 receives refrigerant gas from the evaporator and pressurizes the refrigerant. Heat is extracted from the pressurized refrigerant so that the refrigerant is liquefied at the condenser. The liquefied refrigerant expands after passing through the evaporator valve, causing the temperature of the evaporator to be reduced.

Compressor 308 may include a clutch, a variable displacement control valve, piston, and swash plate. The piston may pressurize the refrigerant in the AC system which flows from air compressor 308 to the condenser. The clutch may be selectively engaged and disengaged to supply compressor 308 with rotational energy from engine 10. One or more auxiliary refrigerant lines may be included to divert refrigerant to other system components routed to receive circulating refrigerant (e.g., refrigerant supply line 304). A valve may be configured to control refrigerant flow through refrigerant supply line 304 via commands from controller 12. The valve may be configured as a three-way valve, such that refrigerant may bypass refrigerant supply line 304 when the valve is in a first position, and may circulate through refrigerant supply line 304 when the valve is in a second position. In other examples, the valve may be coupled within refrigerant supply line 304 positioned in the area between the AC compressor and the cylinder head refrigerant passages, and configured to open or close based on commands from controller 12. The refrigerant may be a suitable refrigerant for use in an AC system, such as Freon. In some examples, liquid nitrogen may be used instead of Freon; in such examples, a pressure relief valve may be present in the refrigerant return line.

As explained above, the refrigerant passage 302 is configured to flow refrigerant around the plurality of inlet ports of the cylinder head. As illustrated in FIGS. 3-5, engine 10 is a four-cylinder engine and hence has four inlet ports, first inlet port 312, second inlet port 313, third inlet port 315, and fourth inlet port 317. Each inlet port is coupled to a respective intake manifold runner 310. Intake air from the intake manifold, after passing through CAC 18 and the upstream compressor, splits and flows through the intake manifold runners 310. Intake air from a respective runner 310 is passed through a corresponding inlet port to a corresponding cylinder to participate in combustion.

Each inlet port has an outer machined seal surface 314 configured to couple to a respective intake manifold runner 310. As shown in FIG. 4, the outer seal surface of each inlet port is continuous, thus creating a single, continuous outer seal surface for all the inlet ports. However, in some examples each inlet port may have a discrete outer seal surface. The inlet ports are arranged in a line along a central longitudinal axis 401 of the inlet ports/outer side surface. Also shown in FIG. 4 is a coordinate system 402, including a vertical axis 404, horizontal axis 406, and lateral axis 408. Central longitudinal axis 401 is parallel to horizontal axis 406.

Each inlet port has an outer profile, defined as the portion of the inlet port that is located outside of the cylinder head. For example, referring to first inlet port 312, the outer profile may be defined by the outer seal surface, a top side 316 of the inlet port, and a bottom side 318 of the inlet port, opposite the top side. The top side 316 is vertically above the bottom side 318, such that when engine 10 is installed in a vehicle, top side 316 is higher above the ground on which the vehicle sits than bottom side 318. The top side of each inlet port may be continuous with a respective bottom side, thus creating a circular, rectangular, or oblong passageway. The center of each inlet port may be hollow to enable flow of intake air into a respective cylinder.

The refrigerant passage 302 extends around the top and bottom of each inlet port. As illustrated, the refrigerant passage 302 is a single, continuous passage that extends parallel to horizontal axis 406 over the top of each of the inlet ports, curves around the outermost, fourth inlet port (e.g., extends parallel to vertical axis 404), and extends along the bottom of each of the inlet ports parallel to horizontal axis 406. Thus, refrigerant passage 302 extends along the top side of first inlet port 312, to and along the top side of the second inlet port 313, to and along the top side of the third inlet port 315, and to and along the top side of the fourth inlet port 317. Refrigerant passage 302 then extends around the side of the fourth inlet port (e.g., around where the top side of the fourth inlet port merges with the bottom side) and extends along the bottom side of the fourth inlet port 317, to and along the bottom side of the third inlet port 315, to and along the bottom side of the second inlet port 313, and to and along the bottom side of the first inlet port 312.

Refrigerant passage 302 extends along the top and bottom sides of the inlet ports and is shaped to correspond to an outer profile of each inlet port. The refrigerant passage 302 has a width that extends outward from the cylinder head (e.g., parallel to lateral axis 408). The width of refrigerant passage may be a suitable width, for example the width may extend from the outer seal surface 314 to the point where the inlet ports reach the side surface of the cylinder head 309. For example, the cylinder head 309 may include a top machined surface configured to couple to a camshaft cover, for example, and refrigerant passage may extend to a side surface 320 of cylinder head 309 adjacent to the top machined surface. The refrigerant passage 302 may be flush with outer seal surface 314 in one example. In other examples, the refrigerant passage 302 may not be flush with the outer seal surface 314, for example the refrigerant passage 302 may terminate prior to the outer seal surface 314. The refrigerant passage 302 may have a suitable height or thickness that is selected based on the refrigerant flow demands of the engine, for example. In one example, the height of the refrigerant passage 302 may be less than one-half the thickness of the wall of an inlet port. The refrigerant passage 302 may have a constant thickness along an entirety of the refrigerant passage 302.

As explained above, the refrigerant passage 302 extends along a top side of each inlet port. While each inlet port comprises a circular or rectangular hollow passage, the outer seal surface 314 is continuous along all inlet ports. The refrigerant passage 302 follows the shape of the outer side surface along the top sides of the inlet ports. That is, the refrigerant passage 302 curves up and along the top side of the first inlet port 312, and curves downward along with the top side of the first inlet port 312, but only for a portion of the curvature of the top side. The refrigerant passage 302 then flattens and follows the shape of the outer seal surface 314 until it reaches the second inlet port, at which point the refrigerant passage curves upward, extends along the flat portion of the top side of the second inlet port 313, and curves down for a portion of the curvature of the top side of the second inlet port 313. As illustrated in FIG. 4, the refrigerant passage 302 may follow the curvature of the top side of a given inlet port for a longer portion than other inlet ports. For example, the refrigerant passage 302 only follows the downward curvature of the top side of the first inlet port 312 for a relatively small portion of the curvature (e.g., 20%) while the refrigerant passage 302 follows the downward curvature of the top side of the second inlet port 313 for a larger portion of the curvature (e.g., 50%).

Similarly, the refrigerant passage 302 extends along a bottom side of each inlet port. The refrigerant passage 302 follows the shape of the outer seal surface 314 along the bottom sides of the inlet ports. That is, the refrigerant passage 302 curves down and along the top side of the fourth inlet port 317, and curves upward along with the bottom side of the fourth inlet port 317, but only for a portion of the curvature of the bottom side. The refrigerant passage 302 then flattens and follows the shape of the outer seal surface 314 until it reaches the third inlet port 315, at which point the refrigerant passage curves downward, extends along the flat portion of the bottom side of the third inlet port 315, and curves upward for a portion of the curvature of the bottom side of the third inlet port 315. As illustrated in FIG. 5, the refrigerant passage 302 may follow the curvature of the bottom side of a given inlet port for a longer portion than other inlet ports. For example, the refrigerant passage 302 only follows the upward curvature of the bottom side of the third inlet port 315 for a relatively small portion of the curvature (e.g., 20%) while the refrigerant passage 302 follows the upward curvature of the bottom side of the fourth inlet port 317 for a larger portion of the curvature (e.g., 50%). In some examples, the refrigerant passage may wrap around the inlet ports to the largest extent possible, e.g., the refrigerant passage may completely surround the entirety of each inlet port other than where fastener bosses and/or adjacent features are located.

Refrigerant passage 302 receives refrigerant from the supply line 304 at a refrigerant inlet 322 and returns the refrigerant to return line 306 at a refrigerant outlet 324. As shown in FIG. 5, the inlet 322 and outlet 324 are located at substantially similar locations of the refrigerant passage. Specifically, both the inlet 322 and the outlet 324 are located on the same side of the first inlet port 312, albeit vertically displaced relative to each other.

Figure 6:
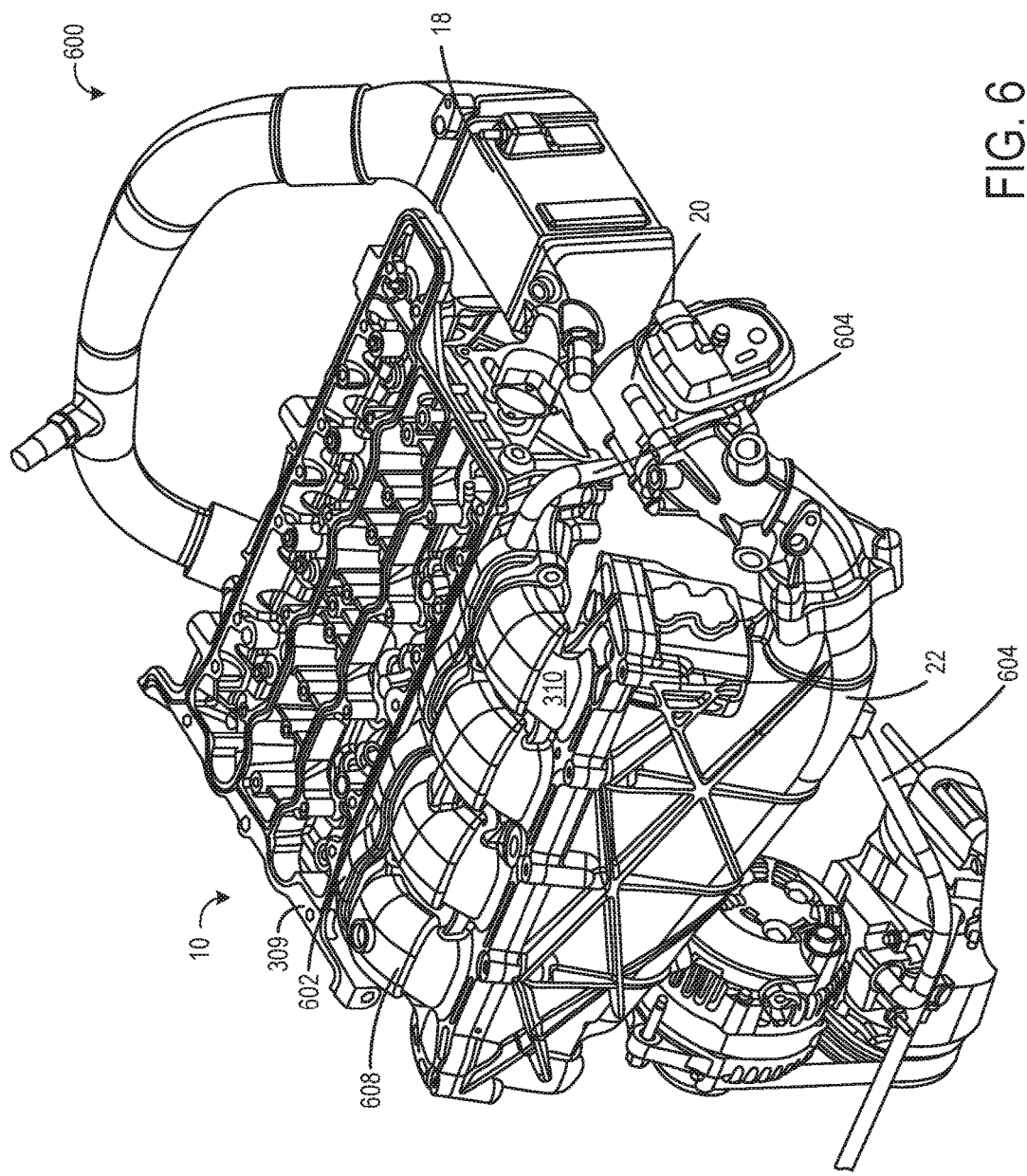
FIGS. 6-10 show a second embodiment of a refrigerant cooling system for cooling intake air prior to entering the engine of FIGS. 1-2.
Figure 7:
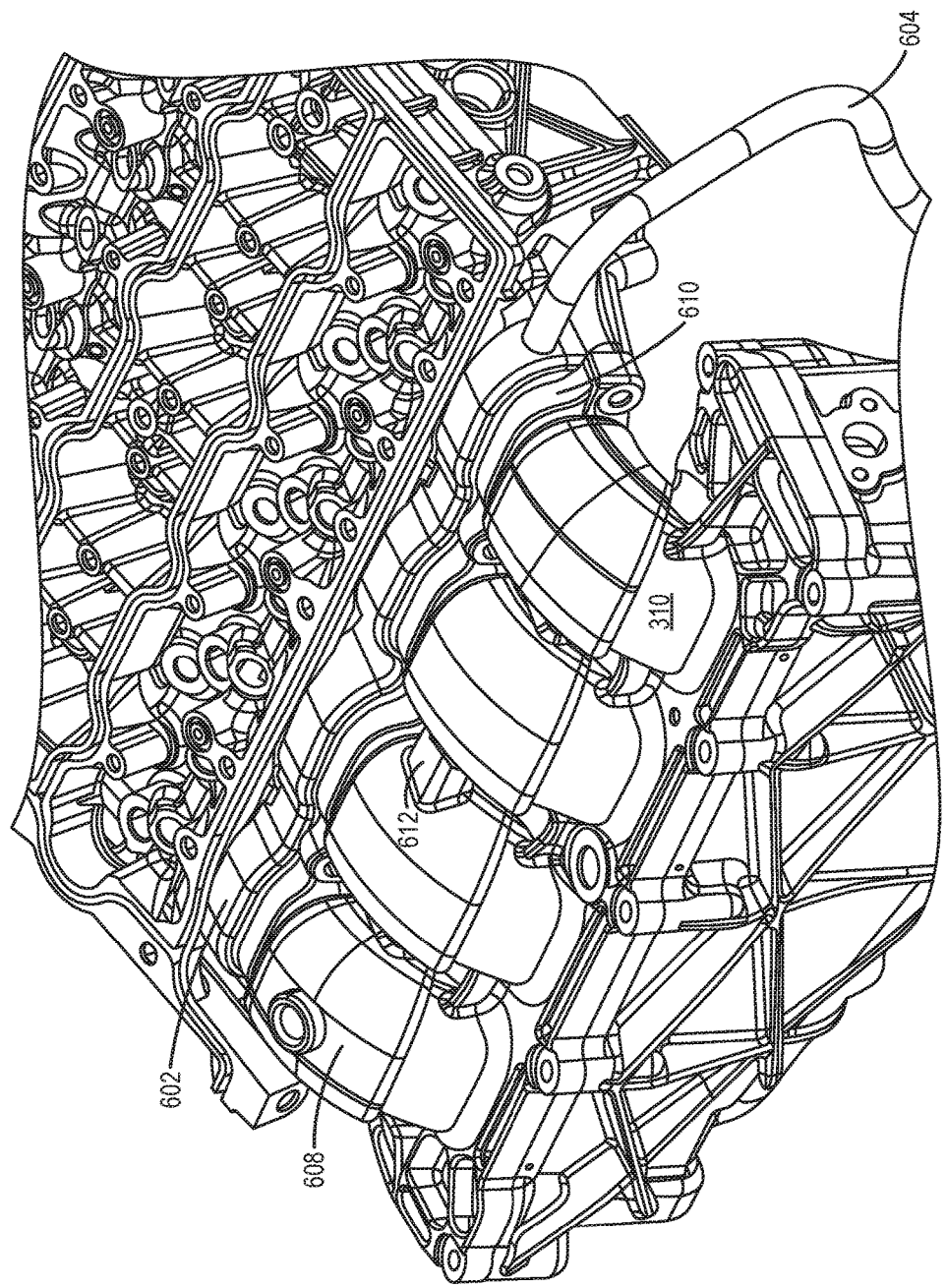
Figure 8:
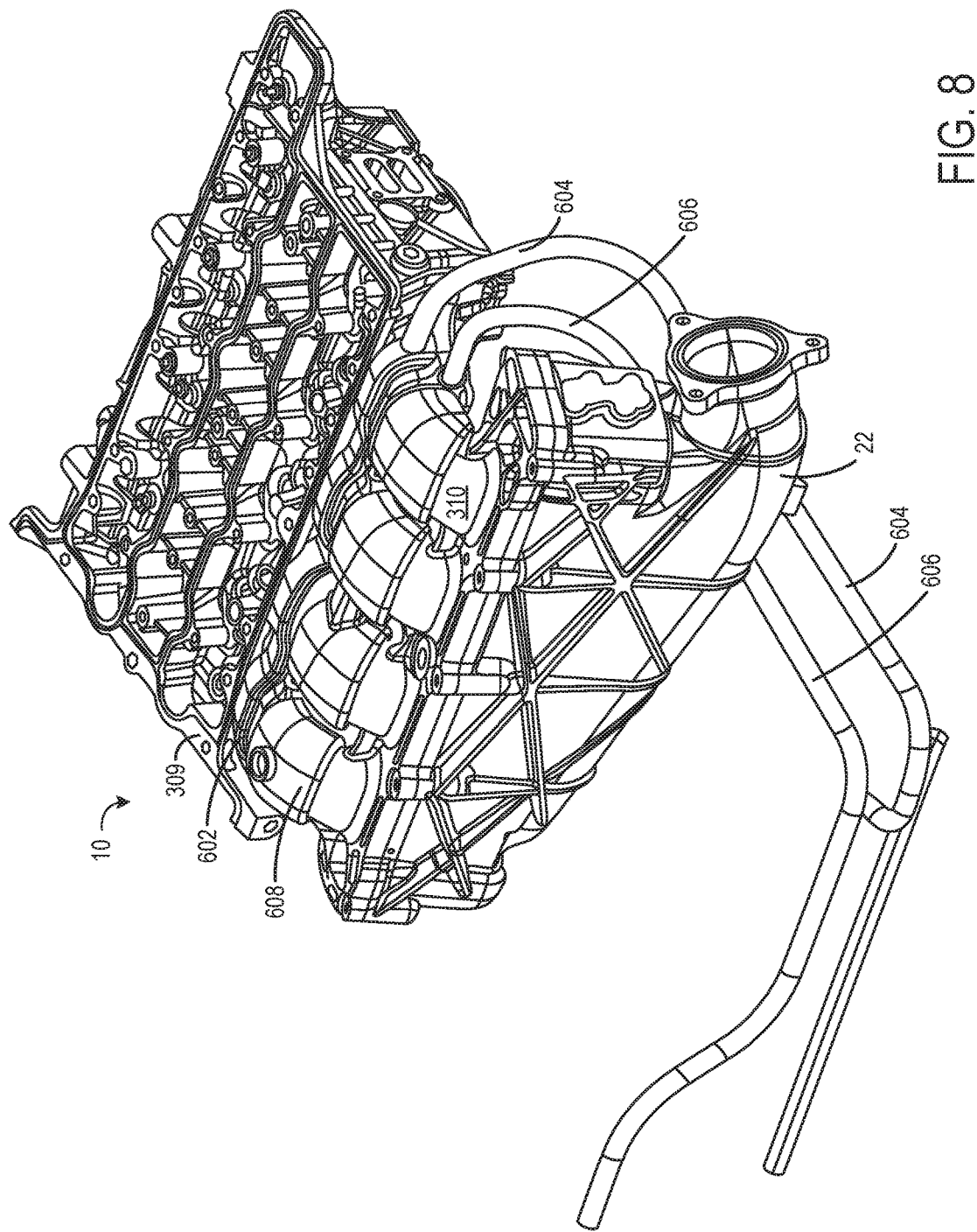
Figure 9:
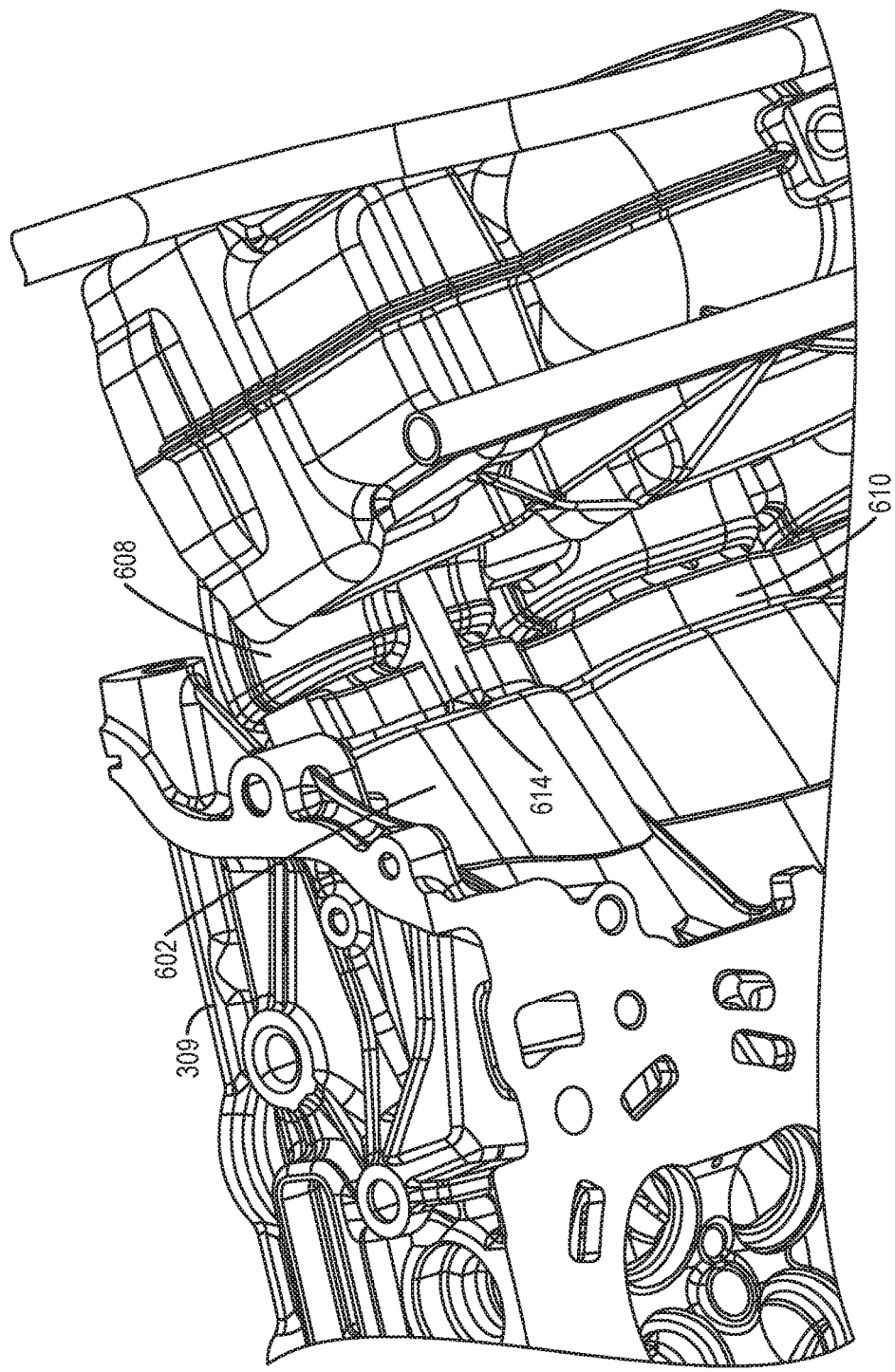
Figure 10:
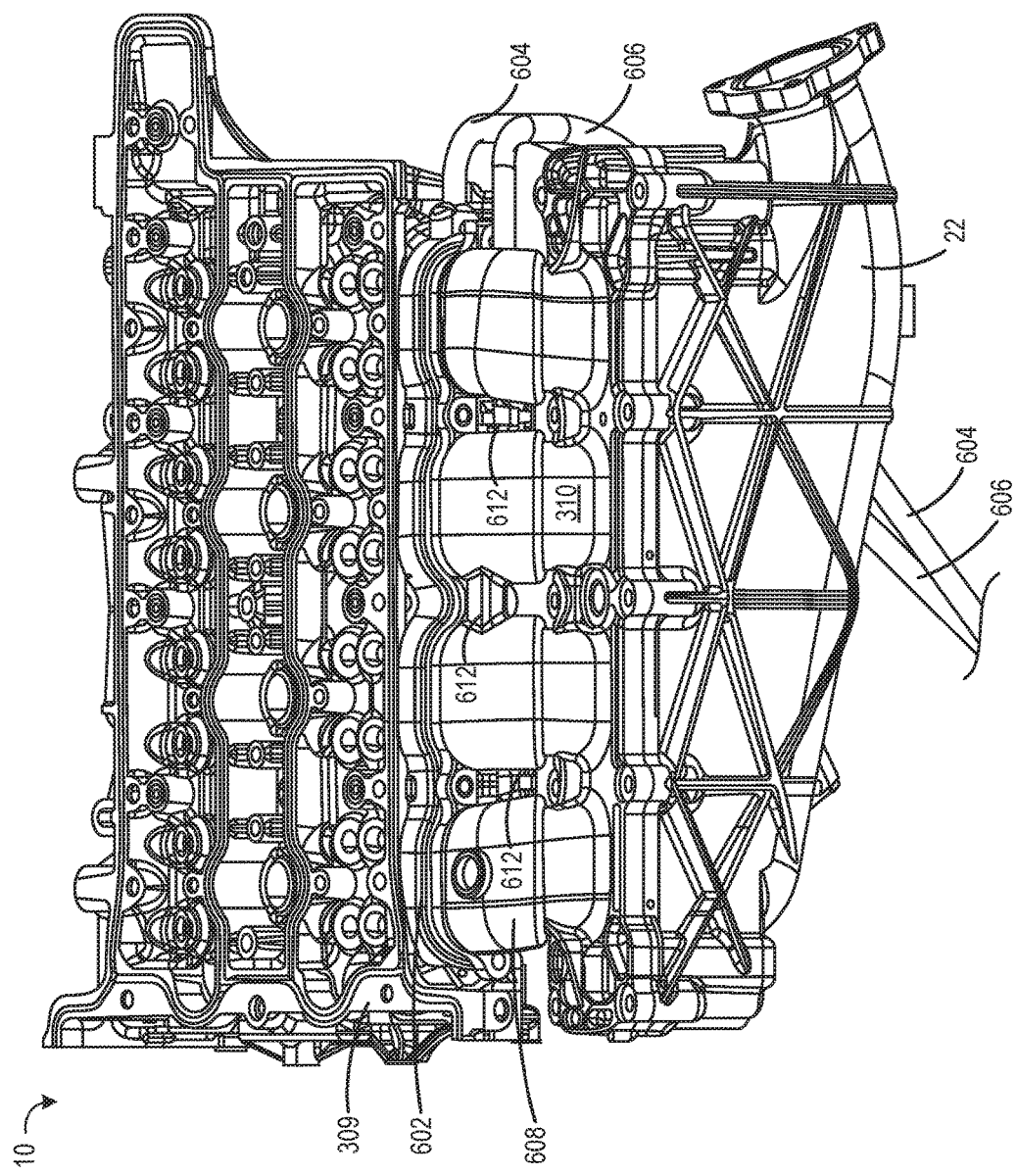

FIGS. 6 and 7 illustrate an alternate embodiment of a refrigerant cooling system 600. Refrigerant cooling system 600 is configured to cool components of engine system 100. Refrigerant cooling system 600 may act to cool intake air entering an engine, such as engine 10 of FIGS. 1 and 2. Accordingly, components illustrated in FIGS. 1 and 2 are given like numbers in FIGS. 6 and 7 and detailed description thereof will be omitted. FIG. 6 shows a side perspective view of the refrigerant cooling system 600, while FIG. 7 shows a magnified top perspective view of the refrigerant cooling system 600.

Refrigerant cooling system 600 includes all the same components as refrigerant cooling system 300 and includes an additional refrigerant passage around the intake manifold runners 310. As such, refrigerant cooling system 600 includes a refrigerant passage 602 coupled around a plurality of inlet ports of cylinder head 309. Refrigerant passage 602 receives refrigerant from a refrigerant supply line 604 and returns refrigerant to a refrigerant supply line (not shown). Refrigerant supply line 604 is coupled to a compressor 308 of AC system 108. The refrigerant return line may be coupled to a condenser of AC system 108 (not shown).

The additional, second refrigerant passage 608 is coupled around the intake runners 310 of the intake manifold 22 and includes a respective connecting passage 612 between each segment of the second refrigerant passage that surrounds each runner. The intake manifold 22 includes a coupling flange 610 defining an outer edge of each runner 310. The coupling flange 610 is configured to be in face-sharing contact with the outer side surface of each inlet port, when the intake manifold is coupled to the engine. Second refrigerant passage 608 is similar to refrigerant passage 602 and 302 in that it has a shape that corresponds to a profile of the intake runners (e.g., extends along a top side of each runner, curves around and extends along a bottom side of each runner). Second refrigerant passage 608 has a top width that extends over more than half the length of each runner. For example, the second refrigerant passage may have a width along a top surface of each runner extending from an inner edge of the coupling flange to beyond a midpoint of each runner. Further, each runner has a bottom surface opposite the top surface, and the second refrigerant passage 608 has a bottom width along the bottom surface of each runner extending from the inner edge of the coupling flange to a point where each bottom surface merges into a body of the intake manifold. The second refrigerant passage may have a thickness equal to the refrigerant passage 302 or 602.

The second refrigerant passage 608 may be fluidically coupled to refrigerant passage 602, or it may be a separate passage that does not supply or receive refrigerant from refrigerant passage 602. In one example illustrated in FIGS. 8-10, refrigerant may be received by refrigerant passage 602, passed around and along each inlet port, passed to the second refrigerant passage 608 via a connecting passage 614, passed around and along each runner 310, and returned via a return line 606 from the second refrigerant passage 608.

Figure 11:
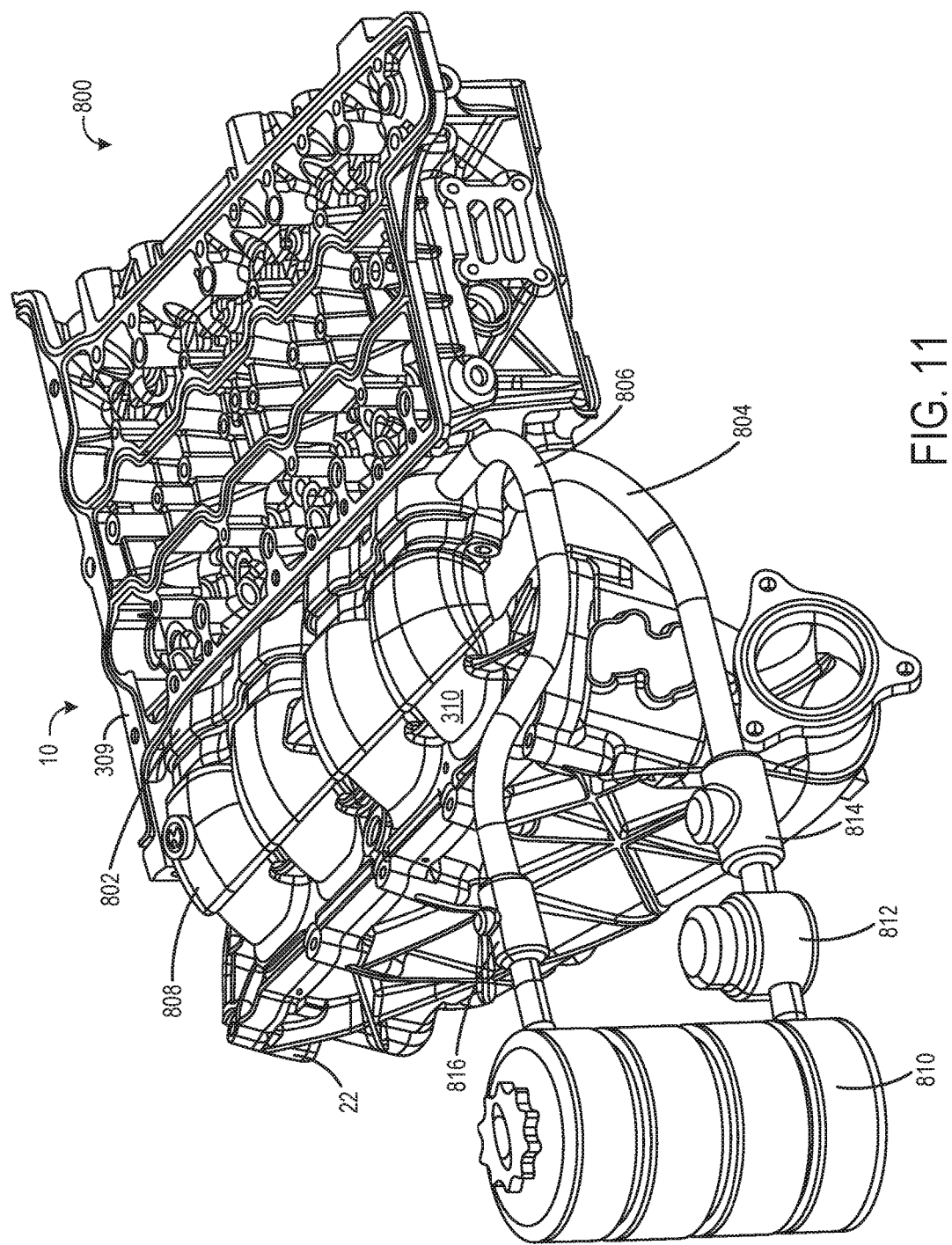
FIGS. 11 and 12 show a third embodiment of a refrigerant cooling system for cooling intake air prior to entering the engine of FIGS. 1-2.
Figure 12:
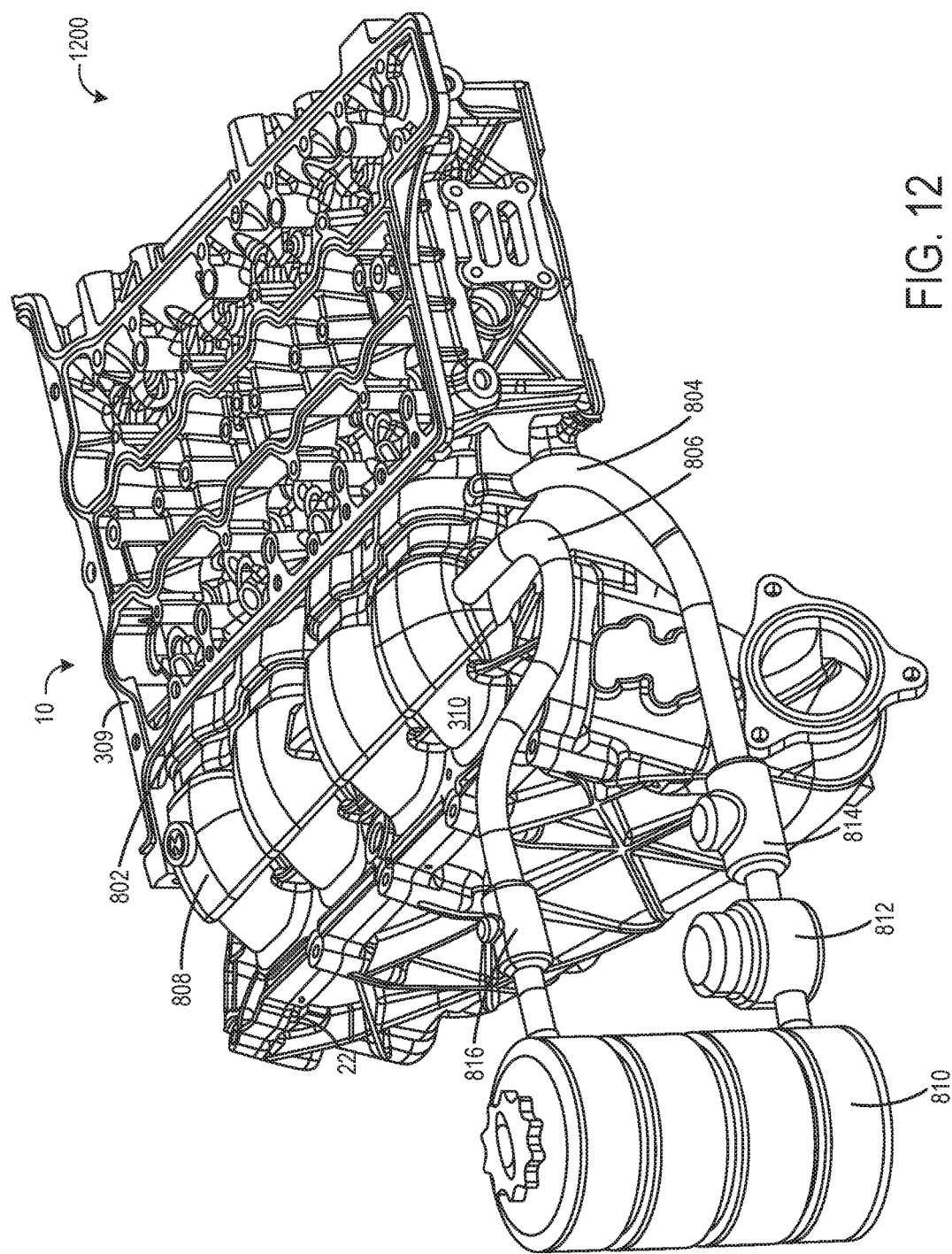
Figure 13:
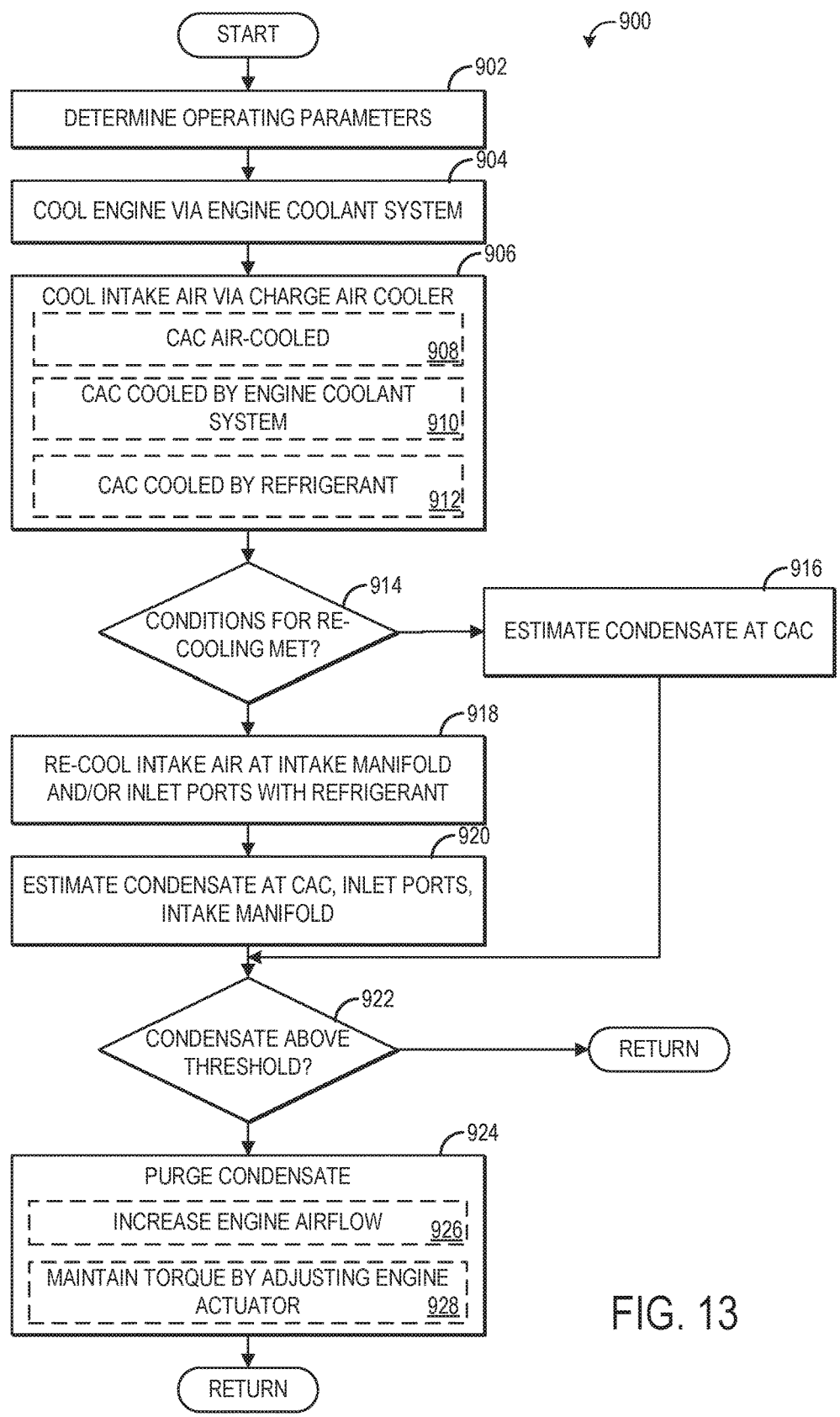
FIG. 13 is a flow chart illustrating an example method for re-cooling intake air using one of the refrigerant cooling systems of FIGS. 3-12.

FIGS. 11 and 12 illustrate an additional alternate embodiment of a refrigerant cooling system 800. Refrigerant cooling system 800 is configured to cool components of engine system 100. Refrigerant cooling system 800 may act to cool intake air entering an engine, such as engine 10 of FIGS. 1 and 2. Accordingly, components illustrated in FIGS. 1 and 2 are given like numbers in FIGS. 11 and 12 and detailed description thereof will be omitted.

Refrigerant cooling system 800 includes many of the same components as refrigerant cooling systems 600, including a refrigerant passage 802 around the inlet ports of the cylinder head 309, a second refrigerant passage 808 around the intake runners 310, a refrigerant supply line 804 and a refrigerant return line 806. FIG. 12 shows a refrigerant cooling system 1200 similar to refrigerant cooling system 800. In system 1200, return line 806 is coupled to second refrigerant passage 808.

Instead of receiving refrigerant from the AC system, refrigerant cooling system 800 and 1200 each includes a refrigerant vessel 810 to store refrigerant. The refrigerant vessel may be a vacuum flask or other suitable tank configured to prevent leakage of the refrigerant. Positioned in refrigerant supply line 804 is a pump 812 and a control valve 814. A pressure relief valve 816 may be positioned in return line 806. Control valve 814 may be include a suitable actuator (e.g., electric, hydraulic, solenoid, etc.) configured to be activated to control the position of the control valve in response to a command from a controller. Pressure relief valve 816 may be a pressure-sensitive valve, a manual valve, or may include an actuator controlled by the controller. Refrigerant vessel 810 may store a suitable refrigerant, such as liquid nitrogen. In some examples, the refrigerant stored in vessel 810 may different than the refrigerant used in the AC system. By relying on a refrigerant source separate from the AC system, fuel consumption may be reduced by reducing the amount of time the AC compressor is driven by the engine.

As the liquid nitrogen or other refrigerant comes in contact with the surrounding heated components (e.g., the inlet ports and/or runners), the refrigerant boils as the heat is absorbed. As the phase change occurs from liquid to gas, the resultant is pressure vapor, which may be released in a controlled manner via the pressure relief valve to control the internal pressure and avoid venting of large amounts of gas vapor within confined spaces. An operator may periodically refill the storage container manually.

Turning now to FIG. 13, a method 900 for re-cooling intake air prior to admission into a plurality of cylinders of an engine is illustrated. Method 900 re-cools intake air via one or more refrigerant passages surround the inlet ports and/or intake runners of the engine, such as refrigerant passage 302, 602, or 802 of FIGS. 3-5, 6-10, and 11-12, respectively and/or second refrigerant passage 608 or 808 or FIGS. 6-10 and 11-12, respectively. To re-cool the intake air, refrigerant may be directed through the refrigerant passages, and may be sourced from a suitable location, such as the AC system 108 (as shown in FIGS. 3-10) or a separate vessel 810 (as shown in FIGS. 11-12). Instructions for carrying out method 900 may be executed by a controller (such as controller 12 of FIGS. 1 and 2) based on instructions stored on a memory of the controller and in conjunction with signals received from sensors of the engine and/or refrigerant cooling system, such as the sensors described above with reference to FIGS. 1 and 2. The controller may employ engine actuators of the engine system to adjust engine and/or refrigerant cooling system operation, according to the method described below.

At 902, method 900 includes determining operating parameters. The operating parameters determined may include, but are not limited to, engine load, engine and/or ambient temperature, boost pressure, and other suitable parameters. At 904, method 900 includes cooling the engine (such as engine 10) via an engine coolant system. The engine coolant system may include a pump to pump coolant through a plurality of coolant passages, through the engine (e.g., through one or coolant jackets of the cylinder head and/or block), through a radiator if engine temperature is above a threshold, and/or through other suitable components.

At 906, method 900 includes cooling intake air via a charge air cooler, such as CAC 18. As explained above, the charge air cooler may cool intake air downstream of the compressor, thus increasing the density of the intake air. The charge air cooler may be an air-to-air cooler, and thus the intake air flowing the through the charge air cooler may be air-cooled, as indicated at 908. In other examples, the charge air cooler may be a liquid-to-liquid cooler. The intake air flowing through the CAC may be cooled via coolant from the engine coolant system, as indicated at 910. In still further examples, the intake air flowing through the CAC may be cooled by the refrigerant from the refrigerant cooling system, as indicated at 912. The CAC may be included as one continuous loop with the refrigerant passages, or it may be included as part of a separate refrigerant loop. The flow of refrigerant through the CAC may be controlled to be inactive during cold starts, active during maximum power output, etc. At 914, method 900 determines if conditions are met for re-cooling the intake air. As described above at 906, the charge air cooler cools the intake air after the intake air is compressed at the compressor of the turbocharger. However, in some engine configurations, the intake air may be re-heated while flowing from the charge air cooler to the engine, due to heat rejection from the engine, high ambient temperatures, or other heat sources. The re-heating of the intake air may reduce the benefits of cooling the intake air via the charge air cooler, for example the intake air may decrease in density, reducing the power output of the engine. Further, the higher temperature intake air may result in increased emissions.

Thus, the intake air may be re-cooled via the refrigerant passages around the inlet ports and/or intake runners of the engine. Because it may not be desirable to re-cool the intake air under all conditions (e.g., overcooling the intake air may reduce combustion stability, increase fuel consumption, and/ or increase emissions), the re-cooling may only be performed during high load and/or high ambient temperature conditions. The conditions for re-cooling the intake air may include ambient temperature over a threshold (e.g., 78° F.). The conditions for re-cooling the intake air may alternatively or additionally include engine load above a threshold, such as operation at greater than 60% maximum rated load. In some examples, re-cooling may only be performed when ambient temperature is above the threshold, regardless of engine load. In some examples, once ambient temperature is above the threshold, re-cooling may be performed once engine load exceeds the threshold load.

If at 914 it is determined that conditions for re-cooling the engine are not met (e.g., ambient temperature is not above the threshold), method 900 proceeds to 916 to estimate the condensate level at the charge air cooler, which will explained in more detail below. If the conditions for re-cooling the intake air have been met, method 900 proceeds to 918 to re-cool the intake air at the intake manifold and/or the inlet ports with refrigerant. To initiate the re-cooling, refrigerant may be directed to the refrigerant passages surrounding the inlet ports and/or intake runners by opening a refrigerant control valve (such as control valve 814 of FIG. 11), activating a refrigerant pump (such as pump 812), engaging a compressor of an AC system (such as AC system 108), or other suitable action. The refrigerant may flow through the refrigerant passages, absorbing heat from the intake manifold and/or inlet ports, thus re-cooling the intake air prior to the intake air being admitted to the cylinders for combustion.

At 920, method 900 includes estimating the condensate at the charge air cooler, inlet ports, and intake manifold. As explained above with respect to FIG. 1, during certain conditions (e.g., when ambient humidity is high and when CAC temperature is low) condensate may accumulate in the CAC. Further, due to the low temperature of the refrigerant circulating through the refrigerant passages around the inlet ports and/or runners, condensate may also accumulate in the intake manifold. Accumulated condensate may degrade the CAC and/or intake manifold, as the condensate may freeze and/or may include acidic compounds (e.g., sulfur from EGR). To reduce the accumulation of condensate and risk of corrosion, condensate may be collected at the bottom of the CAC, and then be purged into the engine during selected engine operating conditions, such as during acceleration events. However, if the condensate is introduced at once into the engine during an acceleration event, there may be an increase in the chance of engine misfire or combustion instability (in the form of late/slow burns) due to the ingestion of water. Engine ignition timing may also be advanced to compensate for the slower burn rate due to the diluted fuel-air charge.

Thus, in some examples condensate may be purged from the CAC and/or the intake manifold to the engine under controlled conditions. This controlled purging may help to reduce the likelihood of engine misfire events. To determine if a controlled purge is needed, the amount of condensate in the CAC, intake manifold, and/or inlet ports may be estimated. Various mechanism may be used to estimate the amount of condensate. In one example, a condensate model may be used for each of the CAC and the intake manifold. For the CAC model, the model may estimate a rate of condensate accumulation, and may include inputs of ambient temperature, charge air cooler outlet temperature, mass air flow, exhaust gas recirculation (EGR) flow (if the engine includes an EGR system), charge air cooler pressure, and humidity. If the humidity is not known (for example, if the engine does not include a humidity sensor), the humidity may be set to 100%. The ambient temperature and humidity may provide an indication of the dew point of the intake air, which may be further affected by the amount of EGR in the intake air (e.g., EGR may have a different humidity and temperature than the air from the atmosphere). The difference between the dew point and the charge air cooler outlet temperature indicates whether condensation will form within the cooler, and the mass air flow may affect how much condensation actually accumulates within the cooler.

The intake manifold model may also estimate the rate of condensation accumulation in the intake manifold, and may include inputs of charge air cooler outlet temperature, mass air flow through the manifold, EGR flow, manifold pressure, humidity, the condensation accumulation rate of the CAC, and intake/charge air temperature downstream of the inlet ports. Because it may not be possible to measure the temperature of the intake air downstream of the inlet ports (and before entering the cylinders), this temperature may be estimated based on charge air cooler outlet temperature, refrigerant temperature and/or flow rate, engine temperature, and/or other parameters. The charge air cooler outlet temperature, humidity, and CAC condensation rate may provide an indication of the dew point of the intake air at the manifold, which may be further affected by the amount of EGR in the intake air (e.g., EGR may have a different humidity and temperature than the air from the atmosphere). The difference between the dew point and the temperature downstream of the inlet ports indicates whether condensation will form within the ports and/or manifold, and the mass air flow may affect how much condensation actually accumulates within the manifold.

Further, 916 of method 900 also includes estimating the condensate at the CAC. The condensate may be estimated as described above. Both 916 and 920 proceed to 922, where it is determined if the condensate level at any one of the CAC, intake manifold, and inlet ports is greater than a threshold. In some examples, the threshold may be a threshold above which condensation forms and below which condensation does not form. In this way, any indication of condensation may be above the threshold. However, in other examples, the threshold may be set such that a small amount of condensate is allowed to accumulate. If the condensate level is not greater than the threshold, method 900 returns to continue to cool the engine, CAC, and/or intake manifold and inlet ports as described above.

If the condensate level is above the threshold, method 900 proceeds to 924 to purge the condensate. The condensate may be purged according to a suitable mechanism, such as by increasing engine airflow, as indicated at 926. This may include closing a wastegate to increase boost pressure, closing a compressor recirculation valve, adjusting intake and/or exhaust valve timing, increasing EGR flow, or other suitable mechanism for increasing engine airflow. Further, to maintain torque during the increase in engine airflow, an engine actuator may be adjusted at 928. The actuator adjusted may depend on where the condensate has accumulated. For example, if condensate has accumulated at the CAC but not the intake manifold, the throttle may be adjusted to increase airflow through the CAC but not through the engine itself. Further, if the engine system includes a recirculation valve downstream of the CAC, the recirculation valve may be opened. If condensate is present in the intake manifold, spark timing may be adjusted to maintain torque. Further, in some examples, if condensate accumulates in the intake manifold, flow of refrigerant to the refrigerant passages may be shut off to prevent accumulation of condensate in the intake manifold, which may be harder to control than condensate in the CAC. Method 900 then returns.

Thus, the method described above re-cools intake air prior to admission in the cylinders to further increase air density and hence engine power. The intake air may be re-cooled via refrigerant rather than engine coolant. As such, the re-cooling of the intake air may provide for substantial cooling of the intake air, cooling the intake air to a higher degree than possible in the charge air cooler. As such, the intake runners and/or inlet ports may have a relatively low temperature, which may increase the amount of condensation that forms on the runners and inlet ports. While the condensation may mostly be swept to the engine (e.g., any condensate on the inlet ports may be immediately passed to the cylinders), under some conditions some condensate may travel to the intake manifold, where it may accumulate.

Thus, proactive purging may be carried out to remove the accumulated condensate before it reaches a level high enough to cause combustion stability issues. As such, in some examples the condensate may be purged out of the intake manifold more frequently than the charge air cooler. Further, the mechanism of purging the condensate may differ between the charge air cooler and the intake manifold.

The extent that the intake air is re-cooled may be affected by several variables, including engine cycle strategy (e.g., Otto cycle or Miller cycle), CAC size and/or placement, engine load, ambient air temperature, etc. In one example, in a Miller cycle engine (late closing intake) at moderate engine load, with reversion events pushed back through a close-coupled CAC (e.g., located 110 mm from the cylinder head intake port inlet) the pre-CAC temperature may be 75° C. and the intake air at the inlet ports may be cooled to less than 36° C. In further examples, a three-way valve may be provided to enable variable amounts of refrigerant to flow to the refrigerant passages, allowing for variable amounts of re-cooling of the intake air (e.g., less cooling when ambient temperatures are lower and more cooling when ambient temperatures are higher).

The technical effect of flowing refrigerant to refrigerant passages surrounding the inlet ports and/or intake runners may be to selectively re-cool the intake air prior to admission in the cylinders, thus improving the power output of the engine, reducing fuel consumption and emissions.

A system includes a cylinder head defining a plurality of cylinders, the cylinder head including a plurality of inlet ports each fluidically coupled to a respective cylinder; a refrigerant supply; and a refrigerant passage surrounding each inlet port and fluidically coupled to the refrigerant supply, the refrigerant passage shaped to correspond to an outer profile of each inlet port. In a first example of the system, the refrigerant supply comprises a vacuum flask housing refrigerant and a refrigerant pump. A second example of the system optionally includes the first example and further includes wherein the refrigerant passage has a refrigerant inlet and a refrigerant outlet on a first side of the refrigerant passage, and wherein the refrigerant passage extends from the inlet, over and around a top side of each inlet port, and over and around a bottom side of each inlet port to the refrigerant outlet. A third example of the system optionally includes one or more or both of the first and second examples, and further includes wherein, along the top side of each inlet port, the refrigerant passage has a width extending from an outer seal surface of each inlet port to a side edge of a top machined surface of the cylinder head. A fourth example of the system optionally includes one or more or each of the first through third examples, and further includes wherein the outer seal surface of each inlet port is configured to couple to a respective runner of an intake manifold. A fifth example of the system optionally includes one or more or each of the first through fourth examples, and further includes wherein the intake manifold comprises a second refrigerant passage surrounding each runner. A sixth example of the system optionally includes one or more or each of the first through fifth examples, and further includes wherein the refrigerant passage of the cylinder head and the second refrigerant passage of the intake manifold are configured to be in fluidic communication. A seventh example of the system optionally includes one or more or each of the first through sixth examples, and further includes wherein the intake manifold includes a coupling flange defining an outer edge of each runner, the coupling flange configured to be in face-sharing contact with the outer seal surface of each inlet port, and wherein the second refrigerant passage has a width along a top surface of each runner extending from an inner edge of the coupling flange to beyond a midpoint of each runner. An eighth example of the system optionally includes one or more or each of the first through seventh examples, and further includes wherein each runner has a bottom surface, and wherein the second refrigerant passage has a width along the bottom surface of each runner extending from the inner edge of the coupling flange to a point where each bottom surface merges into a body of the intake manifold. A ninth example of the system optionally includes one or more or each of the first through eighth examples, and further includes wherein the refrigerant supply comprises a compressor of an air conditioning system. A tenth example of the system optionally includes one or more or each of the first through ninth examples, and further includes wherein the inlet of the refrigerant passage is fluidically coupled to the compressor via a refrigerant supply line, and wherein the outlet of the refrigerant passage is fluidically coupled to a condenser of the air conditioning system via a refrigerant return line. An eleventh example of the system optionally includes one or more or each of the first through tenth examples, and further includes a controller including instructions to direct refrigerant from the compressor to the inlet of the refrigerant passage in response to one or more of an ambient temperature, engine temperature, and engine load.

A method comprises cooling an engine by directing coolant from a cooling system through the engine, cooling intake air upstream of the engine via a charge air cooler, and selectively re-cooling the intake air at one or more of an intake manifold and a plurality of inlet ports of the engine via refrigerant from a refrigerant supply separate from the cooling system. In a first example of the method, cooling the intake air upstream of the engine via the charge air cooler comprises cooling the intake air upstream of the engine by directing coolant from the cooling system through the charge air cooler. A second example of the method optionally includes the first example and further includes wherein cooling the intake air upstream of the engine via the charge air cooler comprises cooling the intake air upstream of the engine by directing refrigerant from the refrigerant supply through the charge air cooler. A third example of the method optionally includes one or more or both of the first and second examples, and further includes wherein selectively re-cooling the intake air comprises re-cooling the intake air responsive to one or more of ambient temperature greater than a threshold temperature and engine load greater than a threshold load. A fourth example of the method optionally includes one or more or each of the first through third examples, and further includes estimating an amount of condensate at one or more of the intake manifold and plurality of inlet ports, and in response to the amount of condensate exceeding a threshold, increasing airflow to the engine to a level greater than requested by an operator of a vehicle in which the engine is installed, without increasing engine torque by adjusting an actuator of the engine to maintain torque.

A system comprises a cylinder head defining a plurality of cylinders, the cylinder head including a plurality of inlet ports each fluidically coupled to a respective cylinder; an intake manifold comprising a plurality of runners each configured to couple to a respective one of the plurality of inlet ports; a refrigerant supply; a first refrigerant passage surrounding each inlet port and fluidically coupled to the refrigerant supply; and a second refrigerant passage surrounding each runner and fluidically coupled to the refrigerant supply. In a first example of the system, the system further comprises a controller configured to direct refrigerant from the refrigerant supply to the first refrigerant passage and second refrigerant passage responsive to ambient temperature above a threshold temperature. A second example of the system optionally includes the first example and further includes wherein the refrigerant supply comprises a compressor of an air conditioning system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
cooling an engine by directing coolant from a cooling system through the engine;
cooling intake air upstream of the engine via a charge air cooler; and
selectively re-cooling the intake air at each of a plurality of inlet ports of the engine by flowing refrigerant through a refrigerant passage positioned around the plurality of inlet ports, where the refrigerant is from a refrigerant supply separate from the cooling system and having a vacuum flask housing refrigerant and a refrigerant pump.

2. The method of claim 1, wherein cooling the intake air upstream of the engine via the charge air cooler comprises cooling the intake air upstream of the engine by directing coolant from the cooling system through the charge air cooler.

3. The method of claim 1, wherein cooling the intake air upstream of the engine via the charge air cooler comprises cooling the intake air upstream of the engine by directing the refrigerant from the refrigerant supply through the charge air cooler.

4. The method of claim 1, wherein selectively re-cooling the intake air comprises re-cooling the intake air responsive to one or more of ambient temperature greater than a threshold temperature and engine load greater than a threshold load.

5. The method of claim 1, further comprising estimating an amount of condensate at one or more of an intake manifold and the plurality of inlet ports, and, in response to the amount of condensate exceeding a threshold, increasing airflow to the engine to a level greater than requested by an operator of a vehicle in which the engine is installed, without increasing engine torque by adjusting an actuator of the engine to maintain torque.

6. The method of claim 1, wherein the refrigerant is liquid nitrogen.

7. The method of claim 6, wherein a pressure relief valve is positioned in a refrigerant return line.

8. The method of claim 1, wherein the refrigerant passage holding the refrigerant extends around a top and bottom of each inlet port, and wherein the refrigerant passage is a single, continuous passage.

9. The method of claim 8, wherein the refrigerant passage is shaped to correspond to an outer profile of each of the plurality of inlet ports and has a width that extends outward from a cylinder head from an outer seal surface to a point where the plurality of inlet ports reach a side surface of the cylinder head.

10. The method of claim 9, wherein the cylinder head includes a top machined surface configured to couple to a camshaft cover, and the refrigerant passage extends to the side surface adjacent to the top machined surface.

* * * * *